United States Patent [19]

Hughes

[11] E Re. 30,704

[45] Reissued Aug. 11, 1981

[54] SELF-LIGHTING CIGARETTE HAVING A PROTECTIVE CAP

[75] Inventor: Lloyd M. Hughes, Chicago, Ill.

[73] Assignee: Lloyd M. Hughes Enterprises, Inc., Chicago, Ill.

[21] Appl. No.: 820,359

[22] Filed: Jul. 29, 1977

Related U.S. Patent Documents

Reissue of:

[64] Patent No.: 3,994,305
Issued: Nov. 30, 1976
Appl. No.: 599,367
Filed: Jul. 28, 1975

[51] Int. Cl.[3] ..... A24D 1/08
[52] U.S. Cl. ..... 131/351; 131/361
[58] Field of Search ..... 131/7, 8 A, 4 R, 9, 131/11, 228

[56] References Cited

U.S. PATENT DOCUMENTS

| | | | |
|---|---|---|---|
| 1,669,843 | 5/1928 | Sakamoto | 131/7 |
| 2,217,713 | 10/1940 | Swan | 131/7 |
| 2,815,028 | 12/1957 | Bernhard | 131/8 A |
| 3,136,318 | 6/1964 | Nakamura | 131/7 |
| 3,244,180 | 4/1966 | Stone | 131/8 A X |
| 3,324,861 | 6/1967 | Gaisman | 131/8 A X |

*Primary Examiner*—Vincent Millin
*Attorney, Agent, or Firm*—Hume, Clement, Brinks, Willian & Olds, Ltd.

[57] ABSTRACT

A self-lighting cigarette is disclosed having a protective or preventive cap enclosing the lip end of the cigarette to prevent the inhalation of the irritating fumes produced by the ignition means. Also disclosed is a means for attaching the self-lighting device to the preventive cap to prevent premature removal of the preventive cap.

19 Claims, 4 Drawing Figures

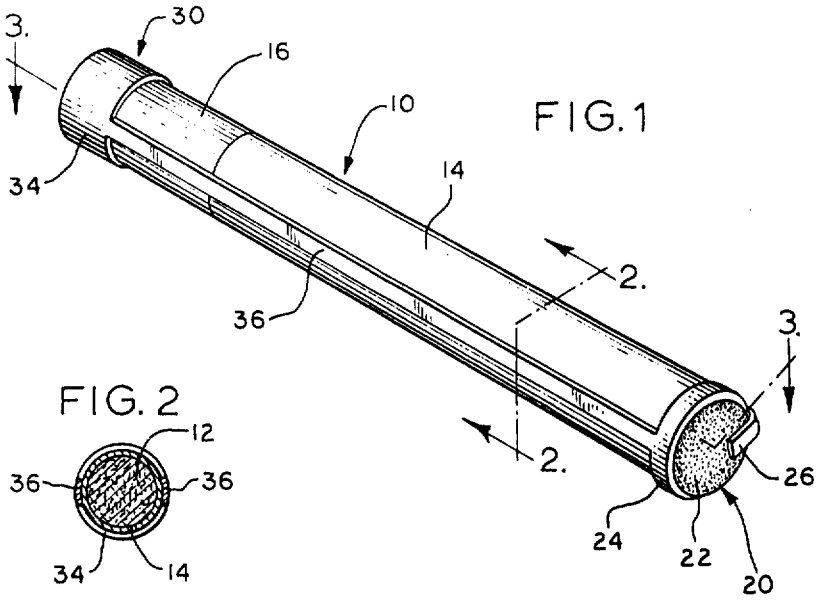
FIG. 1
FIG. 2
FIG. 3
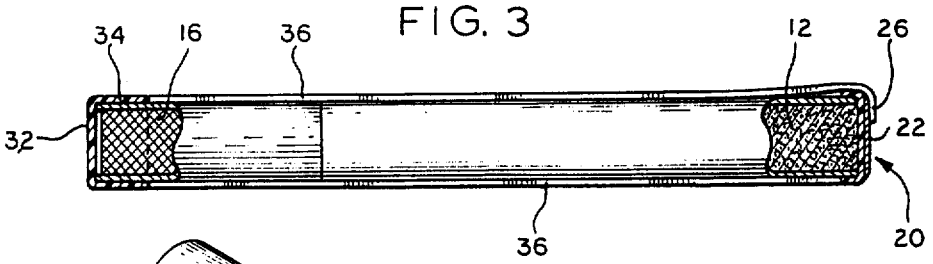
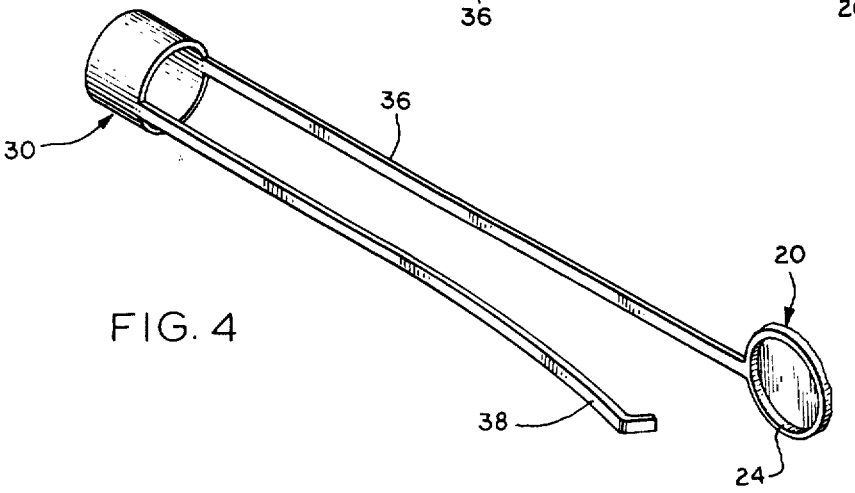
FIG. 4

SELF-LIGHTING CIGARETTE HAVING A PROTECTIVE CAP

Matter enclosed in heavy brackets [ ] appears in the original patent but forms no part of this reissue specification; matter printed in italics indicates the additions made by reissue.

BACKGROUND OF THE INVENTION

This invention relates to an improved, self-lighting cigarette or cigar which helps prevent the inhalation of the irritating and noxious fumes produced by the self-lighting ignition element.

Self-lighting cigarettes have been known for quite some time. Most of these cigarettes are based on the incorporation of combustible substances at one end of the cigarette which ignite when that end is struck on a rough surface. The primary advantage of these cigarettes is the avoidance of any need for matches or an external heat source such as a cigarette lighter.

One of the drawbacks of self-lighting cigarettes is that irritating and noxious fumes are generated by the ignition since the combustible substances used are generally based upon sulfur, phosphorous, or similar compounds. These fumes are frequently drawn into the mouth of the smoker and inhaled, producing an unpleasant sensation and a distaste for self-lighting cigarettes. Many attempts have been made to overcome this problem. Some of them are described in U.S. Pat. No. 2,874,700 to Kahler; U.S. Pat. No. 3,136,318 to Nakamura; and U.S. Pat. No. 3,692,030 to Whang.

SUMMARY OF THE INVENTION

My invention relates to an improved self-lighting cigarette which has an ignition means located at one end of the cigarette and has a means located at the opposite end, the lip end, to prevent the inhalation of the irritating fumes produced by the ignition means. Advantageously, the preventive means is a cap or cover which encloses the lip end of the cigarette and keeps the smoker from inhaling any smoke or fumes through the cigarette until the cap has been removed. Preferably, the cap or cover is made from plastic film.

In a preferred embodiment of my invention, the ignition means or cap is not directly attached to the cigarette paper or the tobacco, but is held on the cigarette by connection or attachment to the preventive cap. This serves two functions. First, it precludes the ignition of the cigarette via the self-lighting means if the preventive cap has been removed from the lip end. Second, if the connecting means is properly designed, it permits the removal of the ignition cap with the preventive cap after the completion of the ignition process. This reduces the possibility that the hot ignition cap will fall on the floor or clothing or burn the smoker when he attempts to remove the ignition cap from the cigarette.

Advantageously, the ignition cap and the preventive cap are attached to each other by one or more straps which may also be made of plastic. Preferably, at least two straps are involved. One of these straps may be designed to burn through during the ignition process while the other may be located in such a way, or of such a thickness, that it will not normally burn through. This later strap will permit the ignition cap to be removed from the cigarette at the same time the preventive cap is removed.

A primary advantage of my invention is that the preventive means will keep the smoker from inhaling the noxious fumes generated by the ignition cap at the other end of a self-lighting cigarette. This will reduce one of the major obstacles to the acceptance of self-lighting cigarettes.

Another advantage of my invention is that the attachment of the ignition cap to the preventive means precludes premature removal of the preventive cap and also promotes easy removal and disposal of the ignition cap without burning the smoker, his clothes, or the carpeting.

Additional features and advantages of my invention are described in, and will appear from, the description of the preferred embodiments which follow and from the drawing to which reference is now made.

DESCRIPTION OF THE DRAWING

FIG. 1 is a perspective view of the self-lighting cigarette of this invention;

FIG. 2 is a sectional view of the self-lighting cigarette of FIG. 1 taken along line 2—2 in FIG. 1.

FIG. 3 is another sectional view of the self-lighting cigarette of FIG. 1 taken along line 3—3 in FIG. 1.

FIG. 4 is a view of the preventive cap, ignition head, and connecting straps of this invention after they have been removed from the cigarette.

DESCRIPTION OF PREFERRED EMBODIMENTS

Referring now to the drawing, reference numeral 10 designates a typical cigarette comprised of a tobacco filler 12 surrounded by a paper wrapper 14. In the particular embodiment shown, cigarette 10 also has a filter 16. While the present invention is primarily intended to be used in conjunction with a cigarette, it can also be used in conjunction with a cigar, a cigarillo or the like.

Located at one end of cigarette 10 is an ignition cap 20 which comprises a combustible ignition head 22 surrounded by collar 24. Ignition head 22 is designed so that it ignites when struck on a surface. It may be designed to function as a "strike-anywhere" ignition head or may be designed to be ignited only when struck on a specially prepared friction surface in a manner similar to a safety match. In the latter case, the specially prepared striking surface may be directly incorporated onto the side of the cigarette package as is shown by FIG. 4 of U.S. Pat. No. 3,692,030. The particular formulations which may be used for the ignition head are generally well known in the art and generally based on one or more phosphorous compounds. However, in addition to the normal igniting agents, the ignition head to be used in conjunction with my invention will preferably contain post-combustion binders such as ground glass or similar materials for the purpose of fusing and holding the ignition head ash together after the cigarette has been ignited. Inert materials such as diatomaceous earth may also be used to provide bulk to the ignition head and to regulate the speed of the combustion reaction.

Ignition head 22 will normally have about the same diameter as that of the cigarette itself. The thickness of ignition head 22 will preferably be on the order of a sixteenth of an inch in order to prevent ignition cap 20 from sliding off the end of the cigarette when striking it on a friction surface, but yet allow easy removal of ignition cap 20 from the end of the cigarette after ignition is complete.

While the ignition head 22 may be attached directly to the cigarette itself by means well known in the art, it is preferably secured not to the cigarette but, as shown in FIG. 1, to collar 24 which is connected via straps 36 to preventive cap 30 located at the lip end of the cigarette. The advantages of this means of attachment will be described below.

As referred to above and as shown in FIGS. 1 and 3, the lip end of the cigarette is enclosed by a protective or preventive cap 30. The primary purpose of this preventive cap is to keep the smoker from inhaling the irritating fumes produced by the ignition cap which would normally be inhaled by the smoker through the cigarette. This preventive cap advantageously comprises an end portion 32 which covers the end of the cigarette and a side portion 34 which extends along side of the cigarette. The length of side portion 34 is preferably on the order of about one-fourth of an inch or more to discourage the smoker from holding the cigarette in his mouth while the cigarette is being ignited and to prevent the inhalation of noxious fumes through the cigarette if it is actually held in the mouth while the ignition cap is still on the other end of the cigarette. For this reason, side portion 34 should normally fit rather snuggly around cigarette 10 or filter 16 if the cigarette is so equipped. A snug fit will also keep the preventive cap from falling off the end of the cigarette before it is intended to be removed. While preventive cap 30 can be made from almost any material, it is advantageously made of paper, plastic, or plastic film.

In a preferred aspect of my invention, the ignition head is not directly attached to the cigarette itself, but to collar 24. The straps and possibly the collar are designed so that one strap becomes severed as a result of ignition. This severing of less than all of the straps may be accomplished by proper shaping of the collar and the straps, by varying the thickness of the collar and straps, using different materials or adhesives, etc.

In the preferred embodiment illustrated, straps 36 connect preventive cap 30 with ignition cap 20. One of the straps is attached to collar 24 while the other passes over the collar and has a tab portion 26 which is attached to the ignition head 22. Preferably these straps are made of paper, plastic or plastic film.

A primary function of straps 36 is to keep the smoker from removing the preventive cap 30 without removing the ignition means 20. If the straps are broken, as would be required if the smoker attempted to remove the preventive cap prior to ignition, the ignition cap 20 will fall from the cigarette, thus precluding ignition via the ignition cap. Accordingly, the smoker will not be tempted to remove the preventive cap prior to ignition and will be kept from inhaling the irritating fumes that would otherwise be drawn through the cigarette from the ignition head 20.

The end result of this aspect of the invention is shown in FIG. 4. In that Figure, broken strap 38 is shown, as is the residual, non-consumed portion of ignition cap 20. As can be seen from FIG. 4, the result of the breaking *of* strap 38 is that ignition cap 20 is still connected to preventive cap 30 and can be easily removed from the cigarette along with the preventive cap. This is accomplished merely by pulling the preventive cap from the lip end of the cigarette. The advantage of this aspect of the invention is that the ignition cap can easily be removed from the cigarette without burning the smoker, his clothes, or the carpeting.

The embodiments described above are intended to be exemplary of the types of ignition, preventive and connecting means which fall within the scope of my invention. However, one skilled in the art would certainly be expected to be able to make modifications and variations of these preferred embodiments without departing from the spirit and scope of the invention as it is defined in the following claims.

I claim:

1. A self-lighting cigarette, which comprises:

a cigarette having a tobacco filler surrounded by a wrapper;

means located at one end of the cigarette for igniting the cigarette by striking it on a surface; and means located at the opposite, lip end of the cigarette for enclosing the lip end during ignition to prevent inhalation of the irritating fumes produced when the cigarette is ignited, said means being removable from the cigarette after ignition to permit normal inhalation during smoking of the cigarette.

2. The cigarette of claim 1, wherein the enclosing means comprises a plastic cap.

3. The cigarette of claim 1, further comprising a means for attaching the ignition means to the enclosing means.

4. The cigarette of claim 3, wherein the ignition means is not directly attached to the cigarette filler or paper, but to the attaching means.

5. The cigarette of claim 3, wherein the attaching means comprises at least one strap.

6. An improved self-lighting [cigarette] *smoking article* having a combustible ignition cap located at one end, wherein the improvement comprises enclosing the opposite, lip end of the [cigarette] *smoking article* with a cover having means for removal thereof after completion of combustion of the ignition cap to prevent the inhalation of the noxious fumes generated by the combustion of the ignition cap.

7. The [cigarette] *smoking article* of claim 6, wherein the improvement further comprises a means for attaching the cover to the ignition cap.

8. The [cigarette] *smoking article* of claim 7 wherein the attaching means comprises a plurality of straps.

9. The [cigarette] *smoking article* of claim 7, wherein the attaching means comprises at least one strap.

10. The [cigarette] *smoking article* of claim 6, wherein the cover is plastic.

11. A self-lighting cigarette, which comprises:

a cigarette having a tobacco filler surrounded by a wrapper;

means located at one end of the cigarette for igniting the cigarette by striking it on a surface;

means located at the opposite, lip end of the cigarette for enclosing the lip end during ignition to prevent inhalation of the irritating fumes produced when the cigarette is ignited; and a plurality of straps for attaching the ignition means to the enclosing means.

12. The cigarette of claim 11, wherein the ignition means is attached to the straps and at least one of the straps is normally not severable by the ignition of the ignition means so that the ignition means can be removed from the cigarette along with the enclosing means.

*13. A cigarette with a protective cap, which comprises:*

*a cigarette having a tobacco filler encircled by a wrapper;*

*means located at one end of the cigarette for enclosing the end during the lighting of the cigarette to prevent inhalation of fumes produced during lighting; and*

*an attachment means for fastening the enclosing means to the cigarette by connecting the enclosing means to the opposite end of the cigarette;*

*whereby the lighting of the end not enclosed by the enclosing means severs the attachment means, permitting the removal of the enclosing means.*

*14. The cigarette of claim 13, wherein the enclosing means comprises a cap.*

*15. The cigarette of claim 13, wherein the attachment means comprises at least one strap extending from the enclosing means to the opposite end of the cigarette, said strap being fastened to the opposite end of the cigarette.*

*16. The cigarette of claim 13, wherein the enclosing means comprises a plastic cap and the attachment means comprises a plurality of plastic straps extending from the cap to the opposite end of the cigarette, said straps being fastened to the opposite end of the cigarette.*

*17. The cigarette of claim 13, wherein the cigarette further comprises a filter at one end of the tobacco filler and the enclosing means is a cap which fits over the filter end of the cigarette.*

*18. The cigarette of claim 17, wherein the attachment means comprises at least one plastic strap extending from the end of the cap to the non-filter end of the cigarette, said strap being fastened to the non-filter end of the cigarette.*

*19. An improved smoking article having a cylindrical tobacco filler encircled by a wrapper, wherein the improvement comprises a cap at one end of the smoking article to enclose said end during lighting and at least one strap extending between the cap and the opposite end of the smoking article, said strap being fastened to the smoking article at said opposite end, to fasten the cap to the smoking article and to permit the severing of the strap when the non-capped end of the smoking article is lit, so that the cap may be removed from the smoking article to permit smoking.*

* * * * *